United States Patent
Kuo (10) Patent No.: US 8,411,626 B2
(45) Date of Patent: Apr. 2, 2013

(54) METHOD AND APPARATUS FOR HANDLING UL-SCH TRANSMISSION

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 670 days.

(21) Appl. No.: 12/577,728

(22) Filed: Oct. 13, 2009

(65) Prior Publication Data

US 2010/0098010 A1  Apr. 22, 2010

Related U.S. Application Data

(60) Provisional application No. 61/107,348, filed on Oct. 22, 2008.

(51) Int. Cl.
*H04W 4/00* (2009.01)

(52) U.S. Cl. ......................... 370/329; 370/341

(58) Field of Classification Search .......... None
See application file for complete search history.

(56) References Cited

U.S. PATENT DOCUMENTS

| 2010/0034158 A1* | 2/2010 | Meylan | 370/329 |
| 2010/0034162 A1* | 2/2010 | Ou et al. | 370/329 |
| 2010/0275086 A1* | 10/2010 | Bergquist et al. | 714/748 |

FOREIGN PATENT DOCUMENTS

| CN | 101094034 A | 12/2007 |
| EP | 1 871 121 | 12/2007 |

OTHER PUBLICATIONS

R2-085612 (3GPP TG-RAN2#63bis; "Message 3 transmission interrupted by the adaptive retransmission command", Samsung, Sep. 29-Oct. 3, 2008).*
R2-081466 (3GPP TSG-RAN WG2 #61bis, Text proposal for TTI bundling, Ericsson, Mar. 31-Apr. 4, 2008).*
3GPP, R2-085978, Sep. 2008.
3GPP, R2-084861, Aug. 2008.
3GPP, TS 36.321 V8.3.0, Sep. 2008.
3GPP TSG-RAN WG2 #54bis, Jan. 12-16, 2009 Ljubljana, Slovenia (R2-090723).
Office Action on corresponding foreign application (CN 200910207737.X) from SIPO dated Aug. 30, 2011.
3GPP TS 36.300 V8.6.0 (Sep. 2008), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), P49-P51.
Office Action on corresponding foreign application (JP2009-236705) from JPO dated Nov. 15, 2011.
Samsung: "Message 3 transmission interrupted by the adaptive retransmission command", Sep. 29-Oct. 3, 2008, 3GPP TSG-RAN2#63bis meeting, Tdoc R2-085612, XP050320408, Prague, The Czech Republic.
Nokia Corporation et al: "Message 3 Definition", Sep. 29-Oct. 3, 2008, [paragraph 5.4.2.1-paragraph 5.4.2.2], 3GPP TSG-RAN2 Meeting #63bis, R2-084999, XP050319971, Prague, The Czech Republic.

(Continued)

*Primary Examiner* — Derrick Ferris
*Assistant Examiner* — Kodzovi Acolatse
(74) *Attorney, Agent, or Firm* — Blue Capital Law Firm, P.C.

(57) ABSTRACT

A method for handling Uplink Shared Channel (UL-SCH) transmission in a User Equipment (UE) of a wireless communication system is disclosed. The method includes steps of performing an UL-SCH transmission, and prioritizing a Message 3 (Msg3) transmission when the Msg3 transmission and a retransmission of a transport block (TB) already stored in an UL HARQ buffer of the UE are scheduled at the same time.

12 Claims, 6 Drawing Sheets

OTHER PUBLICATIONS

Ericsson:"Text Proposal for TTI bundling", Mar. 31-Apr. 4, 2008, 3GPP TSG-RAN WG2#61bis, Tdoc R2-081466, XP050139210, Shenzhen, China.
Samsung:"Correction to prevent message 3 transmission being interrupted by adaptive retransmission command", Sep. 29-Oct. 3, 2008, [paragraph 5.4.2.1], 3GPP TSG-RAN2#63bis meeting,Tdoc R2-085613, XP050320409,Prague,The Czech Republic.
LG Electronics Inc:"Handling of Received UL Grant in RA procedure",Aug. 18-22, 2008, [paragraph 2], 3GPP TSG-RAN WG2 #63, R2-084387,XP050319457, Jeju, South Korea.
Asustek:"Interactions between Msg3 transmission and TTI bundling", Jan. 12-16, 2009, 3GPP TSG-RAN WG2 # 64bis, R2-090133, XP002559922, Ljubljana,Slovenia.

* cited by examiner

METHOD AND APPARATUS FOR HANDLING UL-SCH TRANSMISSION

CROSS REFERENCE TO RELATED APPLICATIONS

This application claims the benefit of U.S. Provisional Application No. 61/107,348, filed on Oct. 22, 2008 and entitled "Method and apparatus of Semi-persistent scheduling configuration during handover and Msg3 transmission when TTI bundling is active in a wireless communication system", the contents of which are incorporated herein by reference.

BACKGROUND OF THE INVENTION

1. Field of the Invention

The present invention relates to a method and apparatus for handling Uplink Shared Channel (UL-SCH) transmission, and more particularly, to a method and apparatus for handling UL-SCH transmission in a UE of a wireless communication system, to prevent an Msg3 transmission from colliding with a retransmission of a previous transmission block (TB) already stored in an UL HARQ buffer of the UE.

2. Description of the Prior Art

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

In the LTE system, a user equipment (UE) needs to initiate a random access procedure for any of the following events, to connect with a Node B. The events are: (1) Initial access from a RRC_IDLE state; (2) Initial access after a radio link failure; (3) Handover; (4) Downlink data arrival during a RRC_CONNECTED state; (5) Uplink data arrival during RRC_CONNECTED. The random access procedure can be performed by contention-based or non-contention-based manner depending on whether a Random Access Channel (RACH) resource used by the UE is assigned by the network or randomly selected by the UE itself.

Figure 1:
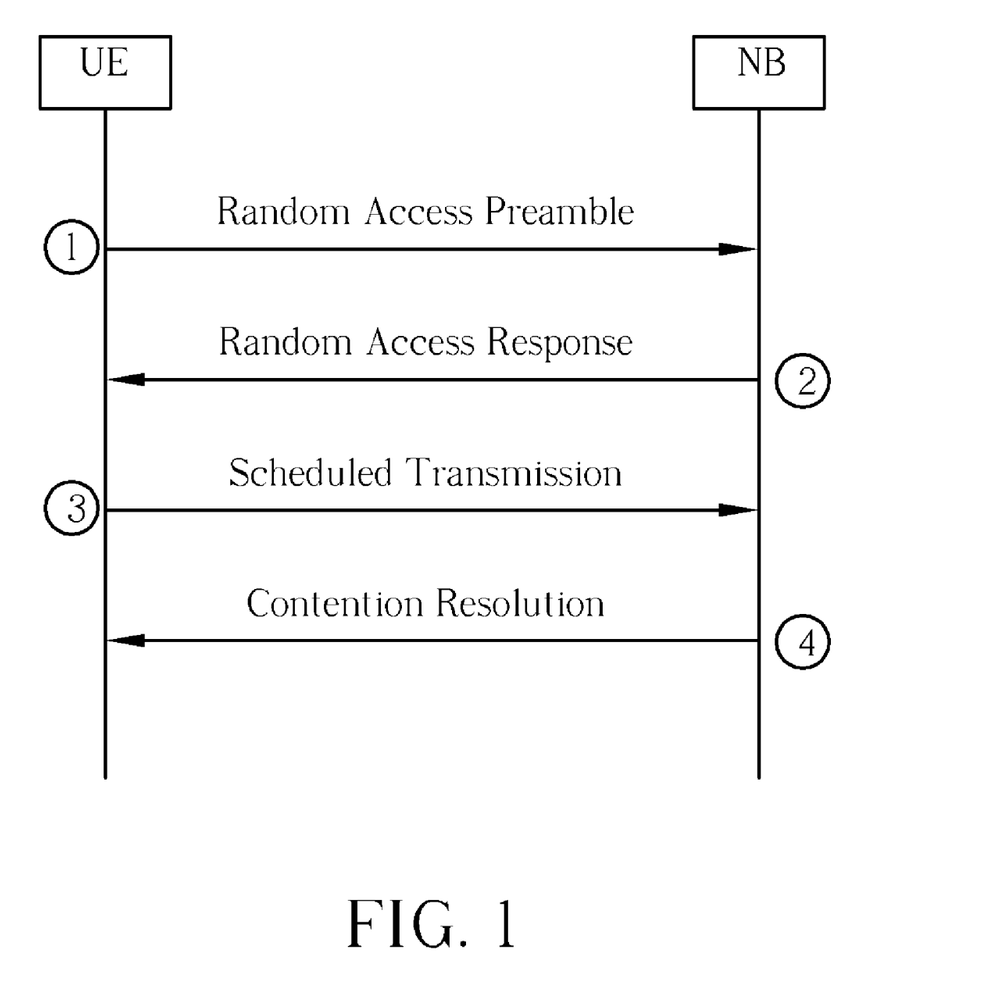
FIG. 1 is a schematic diagram of a contention-based random access procedure.

Please refer to FIG. 1, which is a schematic diagram of a contention-based random access procedure. As shown in FIG. 1, the contention-based random access procedure mainly includes the following four steps: (1) Step "Random Access Preamble on RACH in uplink", (2) Step "Random Access Response on Downlink Shared Channel (DL-SCH)", (3) Step "Scheduled Transmission on Uplink Shared Channel (UL-SCH)", and (4) Step "Contention Resolution on Physical Downlink Control Channel (PDCCH) or DL-SCH". First, when RRC layer or MAC layer initiate a random access procedure, a UE randomly selects a RACH resource to transmit a random access preamble, also called Message 1 (Msg1), to Node B for requesting an uplink grant. A Random Access Response message, also called Message 2 (Msg2), carrying an uplink grant and a Temporary Cell Radio Network Temporary Identifier (Temporary C-RNTI) is then transmitted from the network to the UEs those sent the Random Access Preamble. Thus, the UEs using the same Random Access Preamble in Message 1 would receive the same uplink grant and Temporary C-RNTI from Msg2 and use the same uplink grant to transmit a Scheduled Transmission message, also called Message 3 (Msg3), to the Node B, so as to cause contention between the UEs. The content carried by the Msg3 mainly includes uplink data and a User Equipment Identity (UE ID).

According to different trigger events, the UE ID carried in Message 3 can be divided into two types: Cell Radio Network Temporary Identifier MAC control element (C-RNTI MAC CE) and Common Control Channel Service Data Unit (CCCH SDU). The C-RNTI MAC CE includes a C-RNTI of the UE; while the CCCH SDU includes a UE Contention Resolution Identity provided by an upper layer. Therefore, when the Node B outputs a contention resolution message including a specific UE ID, also called Message 4 (Msg4), contention between the UEs can be solved. Please note that the way to handle Msg4 would be different depending on the UE ID type carried in Msg3. As for detailed description of the random access procedure, please refer to related MAC specifications, which are not narrated herein.

On the other hand, a technique of transmission time interval (TTI) bundling is introduced for improving uplink coverage in the prior art. TTI bundling is performed by repeatedly encoding and transmitting a same transport block (TB) in a set of consecutive TTIs, and those repeatedly transmitted packets are named a TTI bundle. UEs in cell boundary utilizing TTI bundling can reduce transmission delay and signaling of control channels for enhancing reliability and accuracy of data transmission, such that LTE uplink coverage can be improved.

According to current specifications, TTI bundling is characterized as below:

(1) The same HARQ process is used for all transmissions within the TTI bundle.

(2) TTI bundling is switched on/off per UE with higher layer signaling, e.g. Radio Resource Control (RRC) signaling. When switched on, TTI bundling would apply to all uplink transmissions using Physical Uplink Shared Channel (PUSCH).

(3) A bundle is treated as a single resource, i.e., a single grant and a single HARQ feedback (e.g. acknowledgement ACK or non-acknowledgement NACK) is used for each bundle.

Therefore, the retransmission of a TTI bundle is also a TTI bundle. However, for each transmission (except a first transmission) within the TTI bundle, non-adaptive retransmissions are generated by the HARQ process according to a size of the TTI bundle, i.e. the number of consecutive TTIs in the bundle, without waiting for HARQ feedback from previous transmissions. Compared to new transmissions and adaptive retransmissions which are performed on the resource indicated on PDCCH, a non-adaptive retransmission is performed on the same resource as was used for the last transmission. Related HARQ operation is known by those skilled in the art, and is not narrated herein.

It is worth noting that the HARQ Round Trip Time (RTT) for TTI bundling is doubled compared with the normal HARQ operation, i.e. non-TTI bundling operation. That is to say, if a first transmission of a bundle occurs at TTI k, retransmission of the bundle starts at TTI (k+2*HARQ_RTT), where HARQ_RTT represents the HARQ RTT of the normal HARQ operation. For example, in the current specification, the normal HARQ RTT is 8 ms, while the HARQ RTT for TTI bundling is 16 ms.

According to the current specification, the HARQ process is applicable for the Msg3 transmission of a random access procedure. However, the network cannot know whether TTI bundling is activated when the UE performs a random access procedure, so TTI bundling does not apply to the Msg3 transmission. Therefore, the HARQ RTT of the Msg3 transmission is the same as the HARQ RTT of the normal HARQ operation even if TTI bundling is active in a UE. In this case, since the UE can only perform one UL HARQ transmission per TTI, the Msg3 transmission may collide with a retransmission of a previous TB already stored in UL HARQ buffer.

Figure 2:
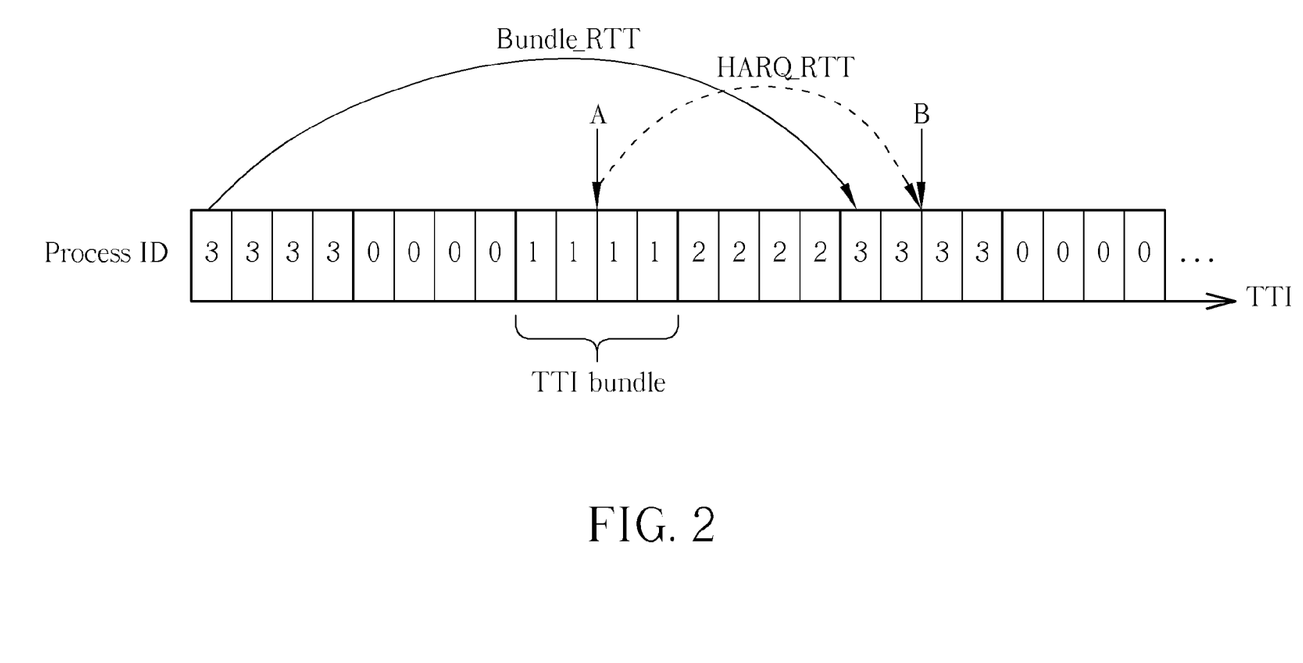
FIG. 2 illustrates a situation that a UE performs an Msg3 transmission when TTI bundling is active.

For example, please refer to FIG. 2, which illustrates a situation that a UE performs an Msg3 transmission when TTI bundling is activated. According to the current specification, when TTI bundling is activated, the number of HARQ processes is 4, and the size of a TTI bundle is fixed to 4, as shown in FIG. 2. Under this condition, an HARQ RRT for TTI bundling Bundle_RTT is 16 ms. Assume that the UE receives an UL grant for Msg3 transmission at time A and uses a first HARQ process (process id=1) to perform an initial Msg3 transmission. If the first HARQ process is already assigned to a transmission of a TTI bundle, the Msg3 transmission may collide with a non-adaptive retransmission of the TTI bundle.

On the other hand, assume the first HARQ process is not assigned to any TTI bundle transmission and completes the initial Msg3 transmission at time A. If the UE cannot successfully receive an ACK for the Msg3 transmission, the first HARQ process would perform an Msg3 retransmission after the HARQ RTT of the normal HARQ operation, i.e. at time B. In such situation, since the HARQ RTT of the Msg3 transmission is different from the HARQ RTT for TTI bundling, the Msg3 transmission may collide with a non-adaptive retransmission of a TTI bundle performed by a third HARQ process (process id=3).

In fact, even if TTI bundling is not active, the initial Msg3 transmission may also collide with a retransmission of the previous TB already stored in UL HARQ buffer, causing the UE at a loss.

SUMMARY OF THE INVENTION

It is therefore an objective of the present invention to provide a method and apparatus for handling uplink shared channel (UL-SCH) transmission, to avoid collision of transmissions.

The present invention discloses a method for handling UL-SCH transmission in a UE of a wireless communication system. The method comprises performing an UL-SCH transmission; and prioritizing a Message 3 (Msg3) transmission when the Msg3 transmission and a retransmission of a previous transport block (TB) already stored in an UL HARQ buffer of the UE are scheduled at same time.

The present invention also discloses a communication device for handling UL-SCH transmission in a UE of a wireless communication system. The communication device comprises a processor for executing a program; and a storage device, coupled to the processor, for storing the program. The program comprises performing an UL-SCH transmission; and prioritizing an Msg3 transmission when the Msg3 transmission and a retransmission of a previous TB already stored in an UL HARQ buffer of the UE are scheduled at same time.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
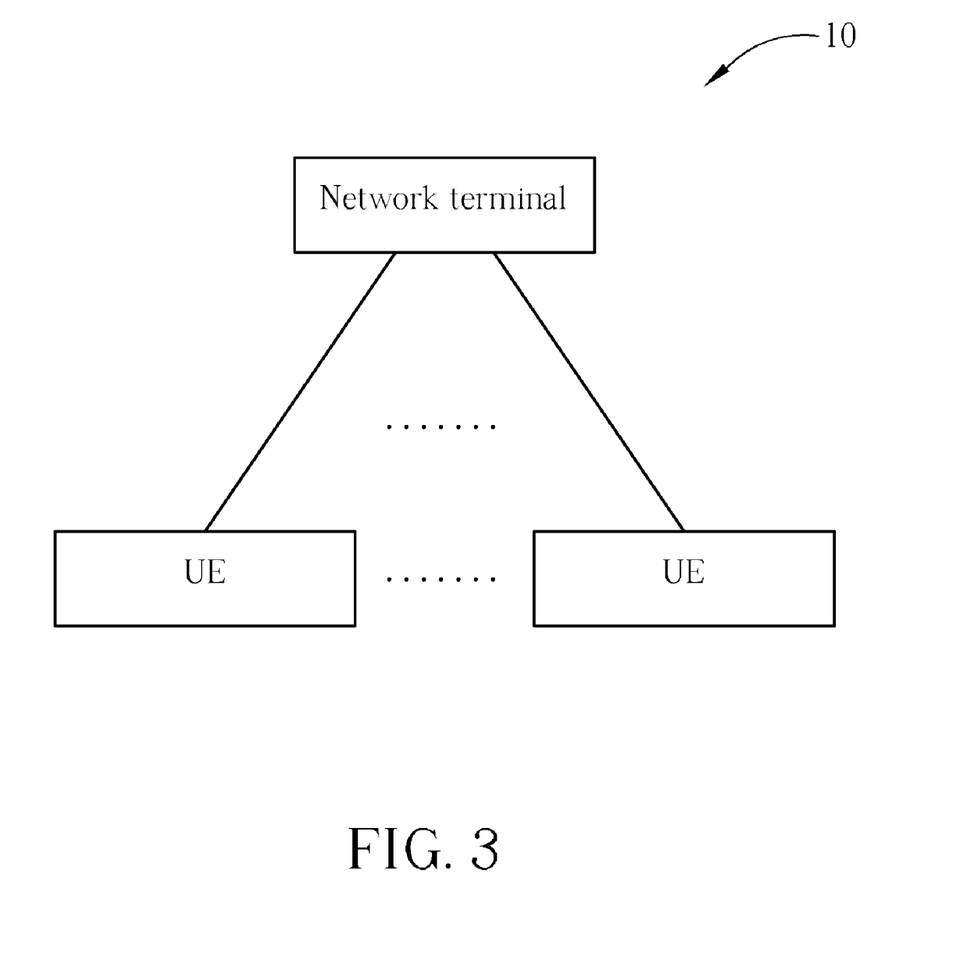
FIG. 3 is a schematic diagram of a wireless communications system.

Please refer to FIG. 3, which is a schematic diagram of a wireless communications system 10. The wireless communications system 10 is preferred to be a Long Term Evolution (LTE) communications system, and is briefly formed with a network terminal and a plurality of user equipments (UEs). In FIG. 3, the network terminal and the UEs are simply utilized for illustrating the structure of the wireless communications system 10. Practically, the network terminal may include a plurality of evolved base stations (eNBs), an evolved UMTS radio access network (EUTRAN) and so on according to actual demands, and the UEs can be apparatuses such as mobile phones, computer systems, etc.

Figure 4:
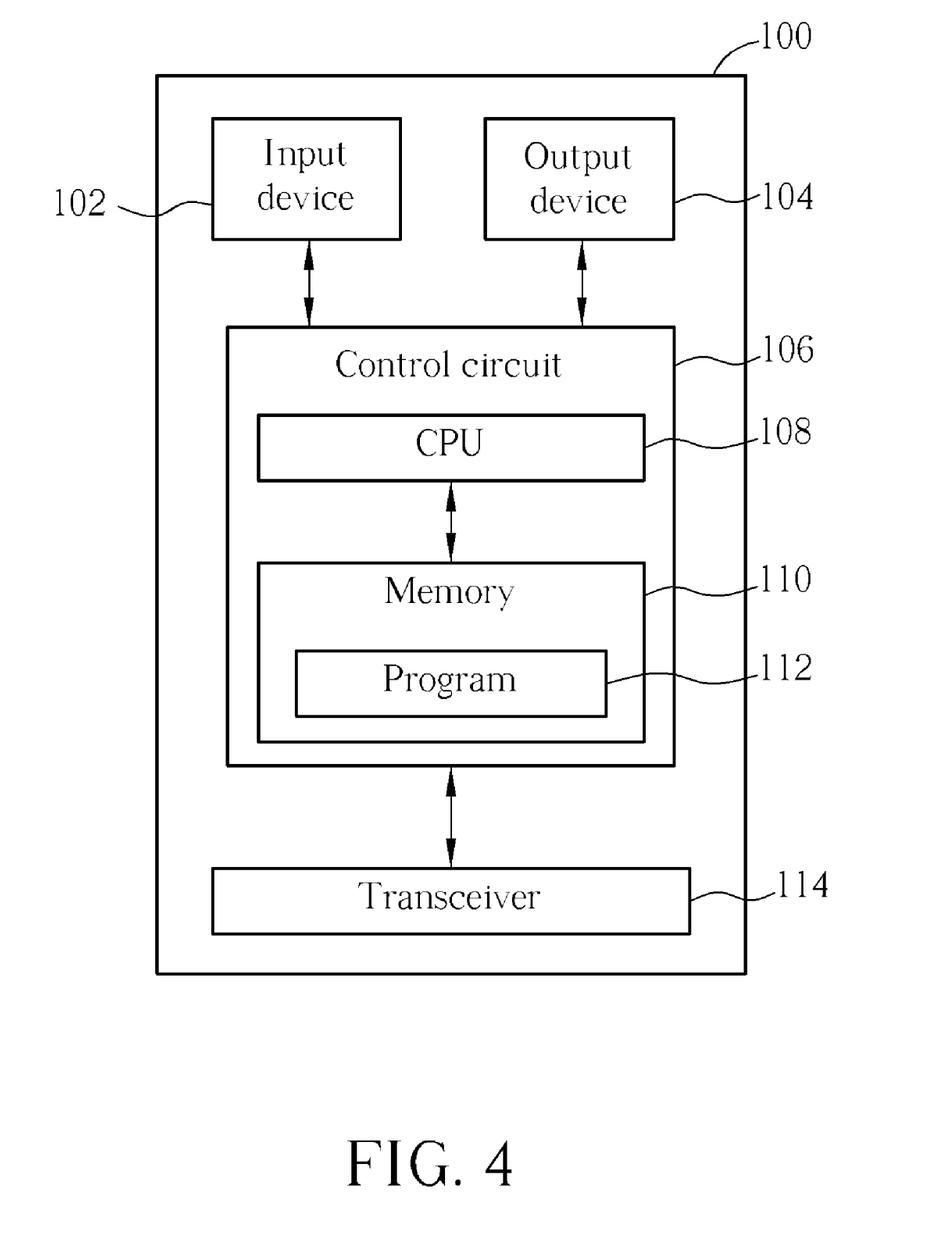
FIG. 4 is a functional block diagram of a communications device.

Please refer to FIG. 4, which is a functional block diagram of a communications device 100. The communications device 100 can be utilized for realizing the UEs in FIG. 3. For the sake of brevity, FIG. 4 only shows an input device 102, an output device 104, a control circuit 106, a central processing unit (CPU) (or processor) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 5:
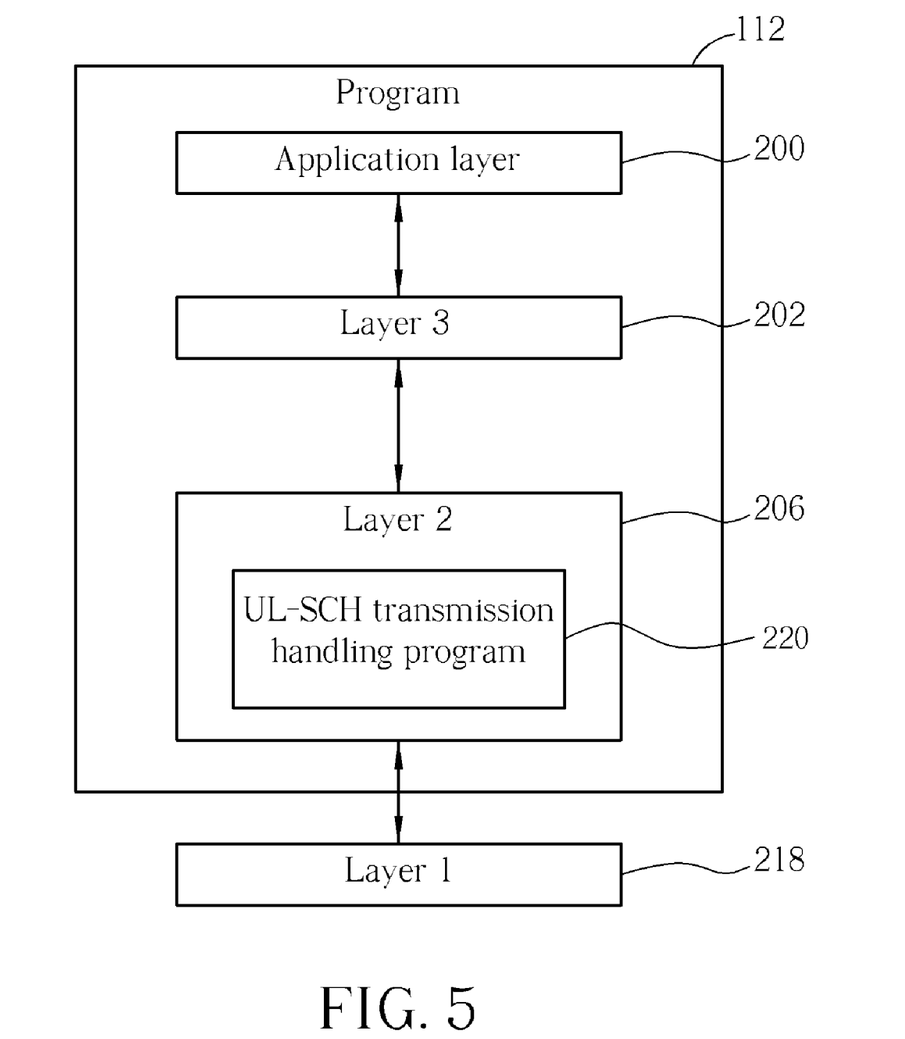
FIG. 5 is a schematic diagram of a program shown in FIG. 4.

Please continue to refer to FIG. 5, which is a schematic diagram of the program 112 shown in FIG. 4. The program 112 includes an application layer 200, a Layer 3 202, and a Layer 2 206, and is coupled to a Layer 1 218. The Layer 3 202 includes a Radio Resource Control (RRC) entity, and is utilized for realizing resource control. The Layer 2 206 includes a Radio Link Control (RLC) entity and a Medium Access Control (MAC) entity, and is utilized for realizing link control. The Layer 1 218 is utilized for realizing physical link.

In LTE system, if a UE performs an Msg3 transmission when TTI bundling is active, since TTI bundling does not apply to the Msg3 transmission and the UE can only perform one uplink HARQ transmission per TTI, the Msg3 transmission may collide with a retransmission of a previous TB already stored in UL HARQ buffer. The Msg3 transmission is an uplink shared channel (UL-SCH) transmission triggered by a random access procedure, and an Msg3 includes a cell radio network temporary identifier MAC control element (C-RNTI MAC CE) or a common control channel service data unit (CCCH SDU), which is known by those skilled in the art, and not narrated herein.

Figure 6:
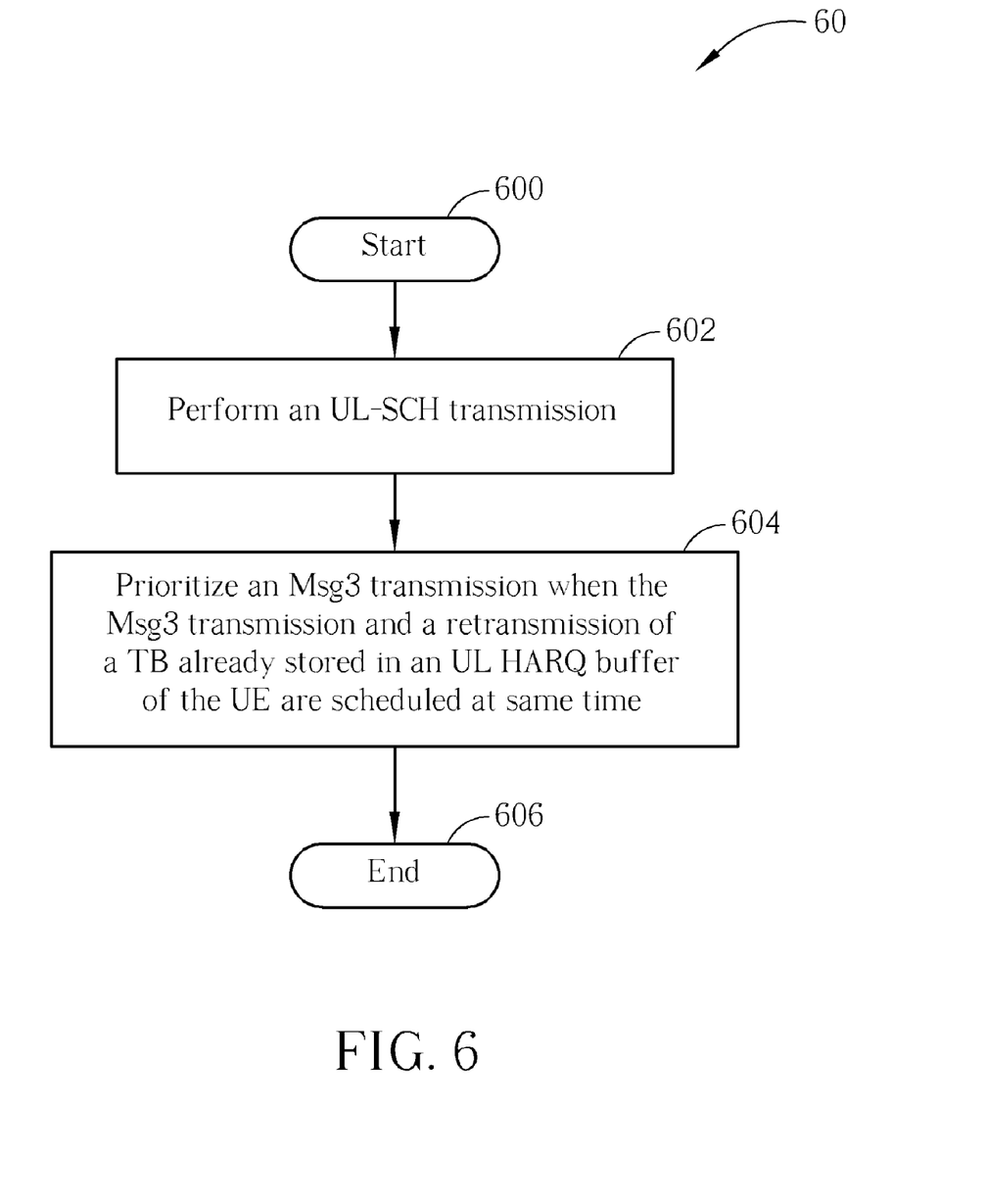
FIG. 6 is a schematic diagram of a process according to an embodiment of the present invention.

In this case, the embodiment of the present invention provides an uplink shared channel (UL-SCH) transmission handling program 220 in the program 112, for preventing an Msg3 transmission from colliding with a retransmission of a previous TB already stored in UL HARQ buffer. Please refer to FIG. 6, which is a schematic diagram of a process 60 according to the embodiment of the present invention. The process 60 is utilized for handling UL-SCH transmission in a UE of the wireless communication system 10, and includes the following steps:

Step 600: Start.

Step 602: Perform an UL-SCH transmission.

Step 604: Prioritize an Msg3 transmission when the Msg3 transmission and a retransmission of a TB already stored in an UL HARQ buffer of the UE are scheduled at same time.

Step 606: End.

According to the process 60, when the UL-SCH transmission is performed, if the Msg3 transmission and the retransmission of the TB already stored in the UL HARQ buffer of the UE are scheduled at the same time, the UE prioritizes the Msg3 transmission over the existing retransmission. As a result, the embodiment of the present invention can prevent the Msg3 transmission from colliding with the retransmission of the previous TB already stored in the UL HARQ buffer.

In the embodiment of the present invention, the said Msg3 is generated by a contention-based random access procedure, and the contention-based random access procedure is preferably initiated due to uplink data arrival. As known by those skilled in the art, the Msg3 transmission is mainly used for providing UE's information, such as data amount to be transmitted, to the network, so the Msg3 transmission is more essential to system scheduling efficiency. In such a situation, the embodiment of the present invention prioritizes the Msg3 transmission over the existing retransmission, for enhancing system efficiency.

For example, please continue to refer to FIG. 2. Assume that the UE receives an UL grant for an Msg3 transmission at time A and uses a first HARQ process (process id=1) to perform an initial Msg3 transmission. If the first HARQ process is already assigned to a transmission of a TTI bundle, the Msg3 transmission may collide with a non-adaptive retransmission of the TTI bundle. In such situation, the embodiment of the present invention prioritizes the Msg3 transmission to avoid transmission collision. Besides, the Msg3 transmission can be considered as a new transmission of the first HARQ process, so the embodiment of the present invention further replaces the TB already stored in the UL HARQ buffer with a TB stored in an Msg3 buffer of the UE.

On the other hand, assume that the first HARQ process completes the initial Msg3 transmission at time A. If the UE cannot successfully receive an ACK for the Msg3 transmission, the first HARQ process would perform an Msg3 retransmission after an HARQ RTT of the normal HARQ operation, i.e. at time B. Since the HARQ RTT of the Msg3 transmission is different from the HARQ RTT for TTI bundling, the Msg3 transmission may collide with a non-adaptive retransmission of a TTI bundle performed by a third HARQ process (process id=3). In such a situation, the embodiment of the present invention prioritizes the Msg3 transmission, and skips the retransmission of the TB stored in the UL HARQ buffer of the third HARQ process, so as to avoid transmission collisions. More specifically, the embodiment of the present invention can flush the UL HARQ buffer of the third HARQ process to skip the retransmission of the TB stored in the UL buffer. Such variation also belongs to the present invention.

Of course, in the embodiment of the present invention, the said TB retransmission is not limited to a non-adaptive retransmission, and can be an adaptive retransmission as well. As a result, when TTI bundling is not active, the embodiment of the present invention can also prevent the initial Msg3 transmission from colliding with the retransmission of the previous TB already stored in the UL HARQ buffer.

To sum up, the embodiment of the present invention provides a method for handling the UL-SCH transmission, to prevent the Msg3 transmission from colliding with the retransmission of the previous TB already stored in the UL HARQ buffer, such that the system performance can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling uplink shared channel (UL-SCH) transmission in a user equipment (UE) of a wireless communication system, the method comprising:
   performing an initial transmission of a transport block (TB) on an UL-SCH transmission via a first Hybrid Automatic Repeat request (HARQ) process;
   performing an initial transmission of a Message 3 (Msg3) via a second HARQ process; and
   prioritizing a retransmission of the Msg3 when the retransmission of the msg3 and a retransmission of the TB are scheduled as same time;
   wherein the Msg3 transmission is an uplink transmission on UL-SCH triggered by a random access procedure, and an Msg3 comprises a cell radio network temporary identifier MAC control element (C-RNTI MAC CE) or a common control channel service data unit (CCCH SDU).

2. The method of claim 1, wherein the method further comprises skipping the retransmission of the TB.

3. The method of claim 1, wherein the retransmission of the TB can be an adaptive retransmission or a non-adaptive retransmission.

4. The method of claim 1, wherein the retransmission of the TB belongs to a transmission time interval (TTI) bundle.

5. The method of claim 1, wherein the random access procedure is initiated due to uplink data arrival.

6. The method of claim 1, wherein the said same time is a same TTI.

7. A communication device for handling uplink shared channel (UL-SCH) transmission in a user equipment (UE) of a wireless communication system, the communication device comprising:
   a processor for executing a program; and
   a memory, coupled to the processor, for storing the program, wherein the program comprises:
   performing an initial transmission of a transport block (TB) on an UL-SCH transmission via a first Hybrid Automatic Repeat request (HARQ) process;
   performing an initial transmission of a Message 3 (Msg3) via a second HARQ process; and
   prioritizing a retransmission of the Msg3 when the retransmission of the msg3 and a retransmission of the TB are scheduled as same time;
   wherein the Msg3 transmission is an uplink transmission on UL-SCH triggered by a random access procedure, and an Msg3 comprises a cell radio network temporary identifier MAC control element (C-RNTI MAC CE) or a common control channel service data unit (CCCH SDU).

8. The communication device of claim 7, wherein the program further comprises skipping the retransmission of the TB.

9. The communication device of claim 7, wherein the retransmission of the
   TB can be an adaptive retransmission or a non-adaptive retransmission.

10. The communication device of claim 7, wherein the retransmission of the TB belongs to a transmission time interval (TTI) bundle.

11. The communication device of claim 7, wherein the random access procedure is initiated due to uplink data arrival.

12. The communication device of claim 7, wherein the said same time is a same TTI.

* * * * *